(12) United States Patent
Trassinelli

(10) Patent No.: US 6,196,561 B1
(45) Date of Patent: Mar. 6, 2001

(54) MULTI-PURPOSE SUPPORT STRUCTURE WITH AN EXTENDABLE HANDLE AND RETRACTABLE WHEELS

(76) Inventor: Duccio Trassinelli, Via San Cresci, 1, Greve In Chianti (IT), 50022

( * ) Notice: Subject to any disclaimer, the term of this patent is extended or adjusted under 35 U.S.C. 154(b) by 0 days.

(21) Appl. No.: 09/147,221
(22) PCT Filed: May 14, 1997
(86) PCT No.: PCT/EP97/02461
  § 371 Date: Oct. 30, 1998
  § 102(e) Date: Oct. 30, 1998
(87) PCT Pub. No.: WO97/43162
  PCT Pub. Date: Nov. 20, 1997
(51) Int. Cl.$^7$ ............................................. B62B 1/00
(52) U.S. Cl. .................... 280/47.26; 280/47.315
(58) Field of Search .................. 280/47.315, 47.34, 280/651, 47.26, 47.131, 47.17, 47.371

(56) References Cited

U.S. PATENT DOCUMENTS

| | | |
|---|---|---|
| 3,857,618 | 12/1974 | Hagen et al. . |
| 4,254,850 * | 3/1981 | Knowles ................................. 190/18 |
| 4,575,109 * | 3/1986 | Cowdery ................................ 280/37 |
| 4,588,055 | 5/1986 | Chen . |
| 4,915,402 * | 4/1990 | Brinker ................................. 280/37 |
| 5,209,576 | 5/1993 | Kasai . |
| 5,259,664 | 11/1993 | Cottle . |
| 5,879,021 * | 3/1999 | Papendick ............................. 280/638 |

* cited by examiner

*Primary Examiner*—Lanna Mai
(74) *Attorney, Agent, or Firm*—Hoffman, Wasson & Gitler

(57) ABSTRACT

A multi-purpose support structure with an extendable handle and retractable wheels, including in combination: a support frame with a pair of longitudinal uprights, and a handle element, with two parallel sides slidable within the uprights and with a transverse connecting side forming a gripping element. Each upright comprises first and second guide channels extending parallel to each other side by side, and said parallel sides of the handle element are slidable within said first guide channel. The support further comprises: a pair of rods provided lowerly with the wheels and slidable within said second guide channels, and means for simultaneously and opposingly moving said parallel sides of said handle element and said rods along their respective guide channels.

4 Claims, 3 Drawing Sheets

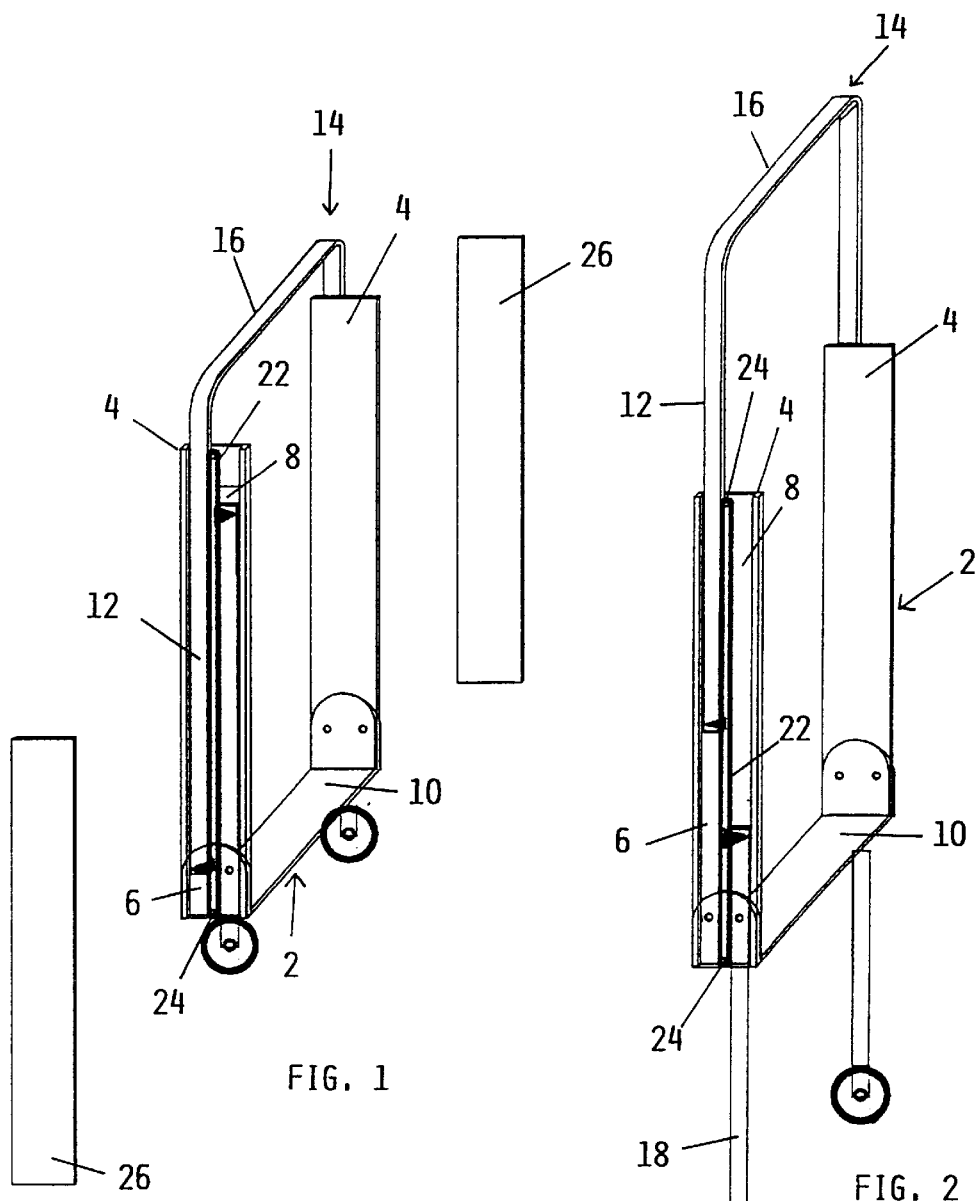
FIG. 1
FIG. 2
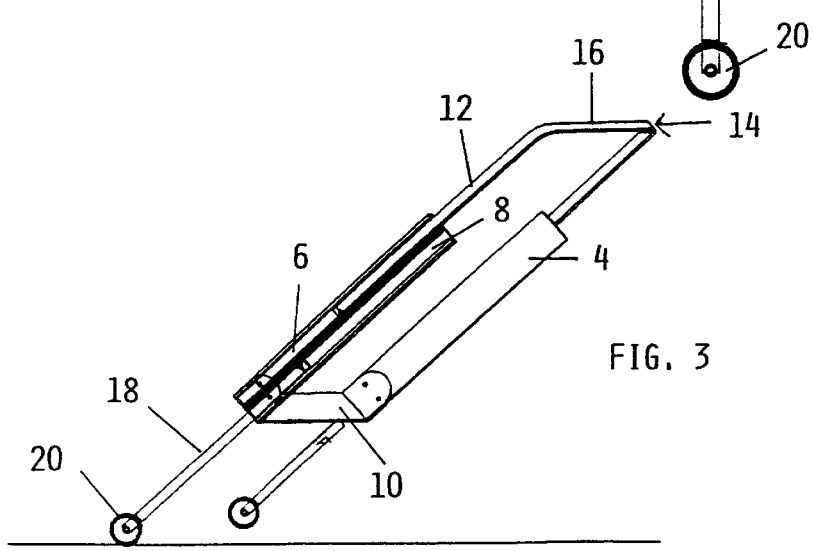
FIG. 3

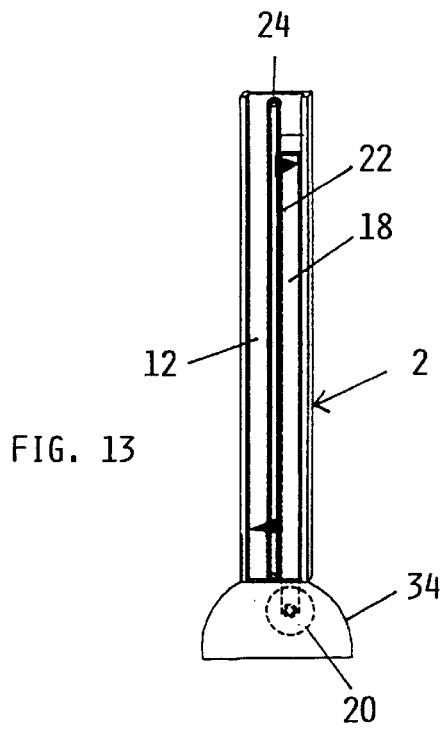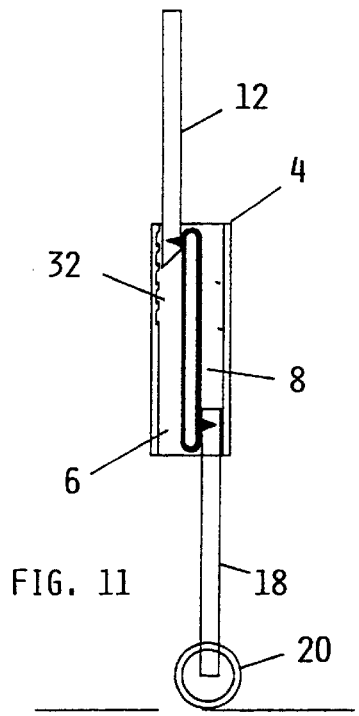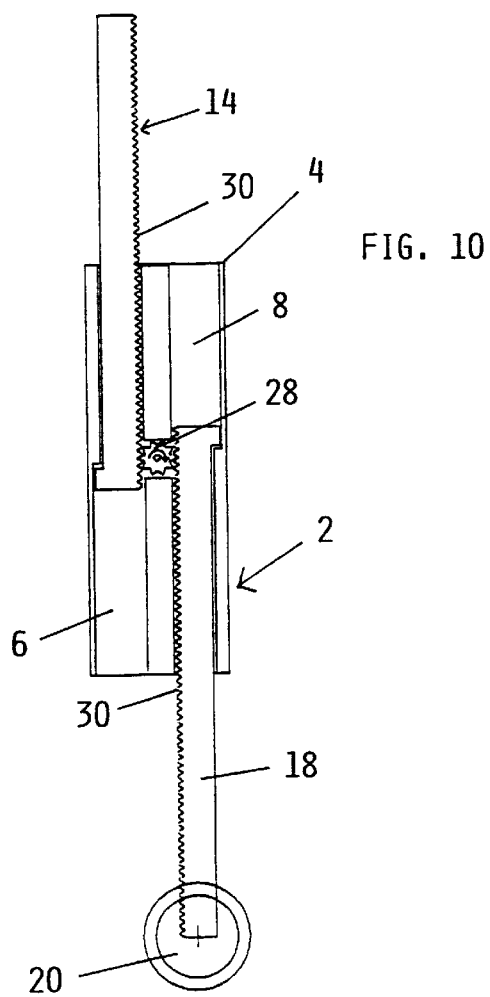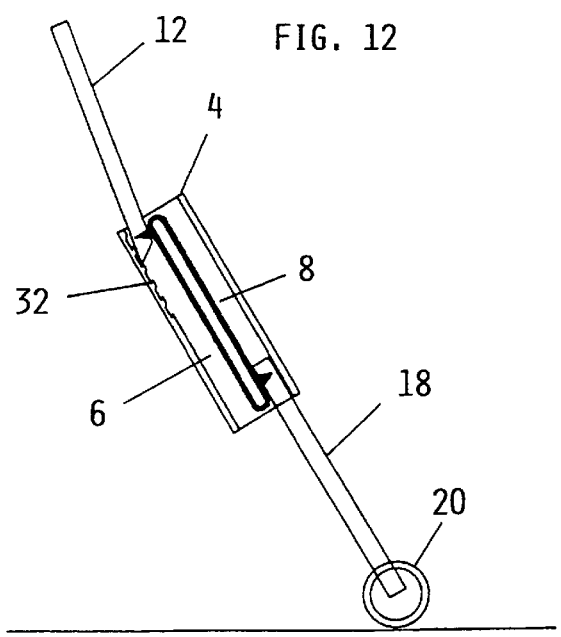

MULTI-PURPOSE SUPPORT STRUCTURE WITH AN EXTENDABLE HANDLE AND RETRACTABLE WHEELS

FIELD OF THE INVENTION

This invention relates to a multi-purpose support structure with an extendable handle and retractable wheels.

DESCRIPTION OF THE PRIOR ART

Wheel-containing structures used to support and transport loads of various types, such as rucksacks, suitcases, bags, books, child carriers, etc., are known. These structures generally pose various problems, related both to their use and to user's requirements. In particular, from starting school, students are often required to transport books and other large heavy scholastic objects to the extent of causing the student to assume a curved position during walking and running. There is hence a consequent risk of malformation, in particular of the spine, with possible negative consequences during that particular period of skeletal development.

Apart from school use, it is usual to transport for the most varied needs various types of bulky objects, rucksacks, suitcases, bags and child carriers, and it is well known that such transportation creates fundamental problems, such as their weight acting totally on the hands or back of the person carrying them, and variability in transportation, which can occur partly in an automobile, partly on foot, partly on a motor bus or other public vehicle, etc.

In seeking to provide an overall solution to the problem, various arrangements have been proposed, such as suitcases with wheels, foldable pushchairs, and foldable carrier trolleys. A suitcase with wheels is very difficult to transport, especially if the wheels are small. A foldable pushchair requires a complicated and difficult operation for its folding. A carrier trolley has the additional nuisance of difficult storage when not in use, and a certain laboriousness in opening the trolley and fixing to it the object to be transported.

U.S. Pat. No. 4,588,055 discloses a device for towing luggage incorporated into a wall of the luggage comprising a pair of fixed tubes, a pair of push-pull tubes and a U-shaped tube wherein each end of the U-shaped tubes is connected to the push-pull tubes.

An object of the invention is to provide a multi-purpose support structure which can be used in the most varied situations, and is of small overall size, is easily transformed and is totally adaptable to different applications.

BRIEF SUMMARY OF THE INVENTION

This and further objects which will be apparent from the ensuing description are attained according to the invention by a multi-purpose support structure with an extendable handle and retractable wheels, including in combination:
a support frame with a pair of longitudinal uprights,
a handle element, with two parallel sides slidable within the uprights and with a transverse connecting side forming a gripping element,
wherein:
each upright comprises first and second guide channels extending parallel to each other side by side,
said parallel sides of the handle element are slidable within said first guide channel,
and wherein it further comprises:
a pair of rods provided lowerly with the wheels and slidable within said second guide channels, and
means for simultaneously and opposingly moving said parallel sides of said handle element and said rods along their respective guide channels.

BRIEF DESCRIPTION OF THE DRAWINGS

Some preferred embodiments of the present invention are further described hereinafter, with reference to the accompanying drawings in which:

FIG. 1 is a partly exploded perspective view of a multi-purpose support structure of the invention in its retracted configuration;

FIG. 2 shows it in the same view as FIG. 1 but in its extracted configuration;

FIG. 3 shows it is in its extracted and working configuration;

FIG. 10 shows a different embodiment thereof in the same view as FIG. 2;

FIG. 11 shows a third embodiment thereof in the same view as FIG. 2;

FIG. 12 shows this third embodiment in the same view as FIG. 3; and

FIG. 13 shows the particular of the lower end of the section bar elements.

DESCRIPTION OF PREFERRED EMBODIMENTS

Figure 4:
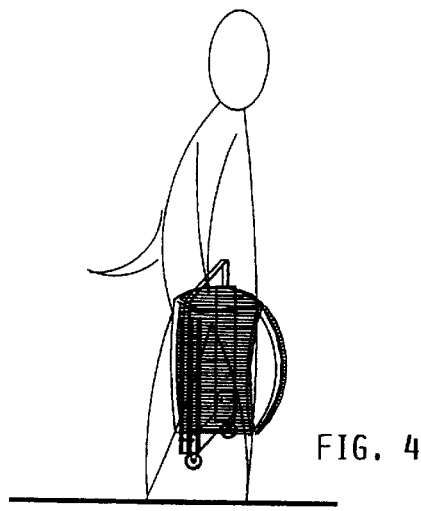
FIG. 4 shows it applied to a hand-carried rucksack.

As can be seen from the figures, the multi-purpose support structure according to the invention comprises an essentially U-shaped support frame 2, with two longitudinal section bar elements 4 each containing a pair of guide channels 6 and 8 and joined together by a transverse element 10.

In the corresponding guide channels 6 of the two longitudinal section bars 4 there are slidable two parallel arms 12 of a handle element 14 which, in addition to said arms 12, comprises a transverse connecting element 16, forming the handgrip for the user.

Two rods 18, each provided lowerly with a wheel 20, are slidingly housed in the other corresponding guide channels of the two longitudinal section bars 4.

With the aim of strenghtening the structure, the two rods 18 are connected each other with through a bar (not shown in the drawings).

Each rod 18 is connected to the corresponding arm 12, ie to that arm associated with the same longitudinal section bar 4 of the support frame 2, by a substantially non-extendable endless belt 22 passing taut about return rollers 24 applied to each section bar 4 and fixed at its two straight sides to the respective arm 12 of the handle element 14 and to the respective rod 18.

To each section bar 4, which for the reasons explained hereinafter has a length substantially equal to that of the arms 12 and of the rods 18, there can be applied a cover strip 26, which completely closes the guide channels 6 and 8, while enabling said arms 12 and said rods 18 to slide within them. Furthermore the lower end of each section bar 4 may be provided with a shell body 34 housing the wheels 20 in retracted configuration of the structure (see FIG. 13).

Figure 7:
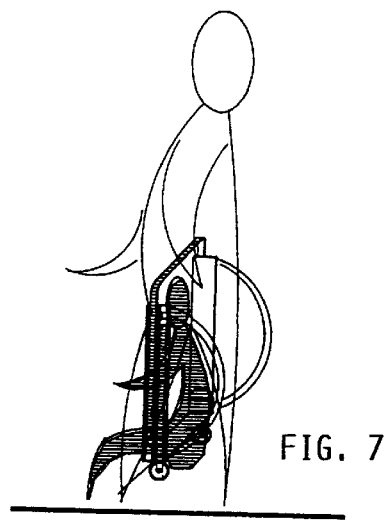
FIG. 7 shows it applied to a hand-carried child carrier.
Figure 5:
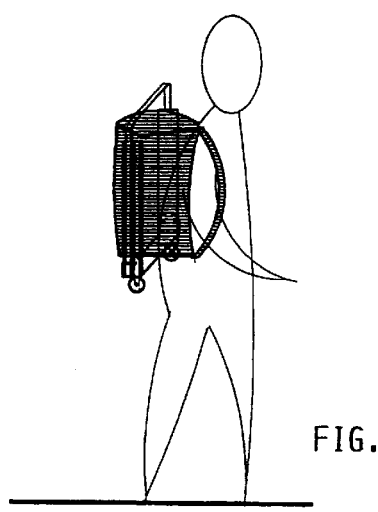
FIG. 5 shows it applied to the same rucksack, but shoulder-carried.
Figure 8:
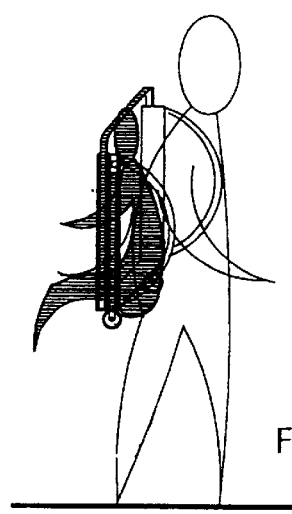
FIG. 8 shows it applied to the same carrier, but shoulder-carried.
Figure 6:
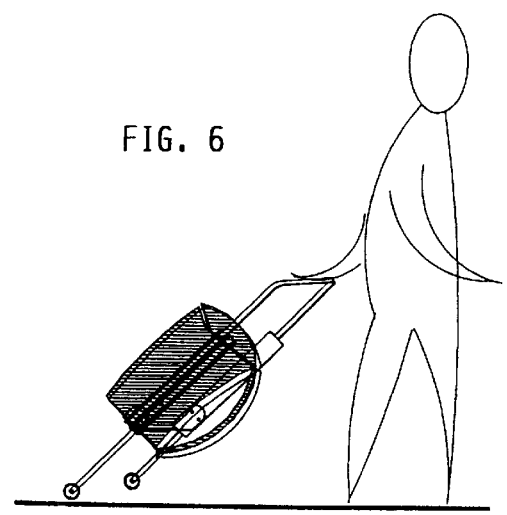
FIG. 6 shows it applied to the same rucksack used as a trolley.
Figure 9:
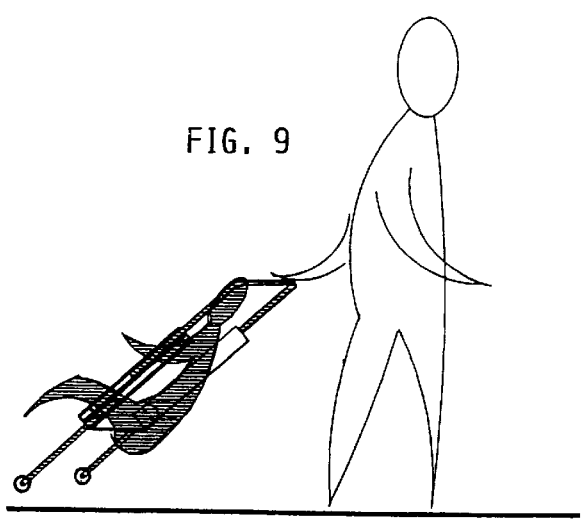
FIG. 9 shows it applied to the same carrier used as a pushchair.

For a better understanding of the operation of the multi-purpose support according to the invention, reference will be made to its possible uses, for example applied to a rucksack (see FIGS. 4–6) or to a child carrier (see FIGS. 7–9). In both cases, the fixing can be by traditional straps or connectors which make it totally visible form the outside, or by insertion into appropriate interspaces provided in the rucksack or carrier, so as to be completely hidden from view except for the handgrip 16 of the handle element 14 and the wheels 20.

Due to the simple shape of the structure it is possible to provide it with mushroom shaped appendices engageable by rings foreseen in the rucksack or by applying to the same rucksack two foldable bands engageable with Velcro® strip.

On this bases, the operation of the multi-purpose support according to the invention is as follows:

when in the rest condition, the handle element 14 and the rods 18 are retracted into the support frame 2 and occupy only a small space. In this state the rucksack or carrier can be used conventionally, ie carried by hand via a handle with which it is generally provided (see FIGS. 4 and 7) or carried on the shoulders by a pair of straps, with which it is likewise provided (see FIGS. 5 and 8).

In this state, because the weight of the handle element 14 is greater than the weight of the rods 18 with their wheels 20, and because of their connection by the belts 22, their retracted state is maintained even in the case of inevitable knocks during transportation.

When the support is to be used as a trolley, the user, while maintaining the structure vertical, merely pulls the handle element 14 so that the weight of the support and the rucksack applied to it causes upward extraction of the handle element 14 and simultaneous downward extraction of the rods 18. This simultaneous opposite extraction is obviously limited by the points of fixing of said handle element 14 and said rods 18 to the belts 22, these points being chosen to prevent the arms 12 and rods 18 completely escaping from their respective guide channels 6,8.

Having achieved the desired extent of elongation, the support of the invention can be used as a trolley, maintained in a traditional inclined arrangement (see FIGS. 6 and 9) which, because of the weight of the assembly, exerts on the lateral walls of the guide channels 6,8 a transverse force which provides stability of the configuration attained. This stability can be accentuated by treating the lateral walls of the guide channels and/or the surface of the arms 12 and rods 18 to increase mutual sliding friction.

To return to the retracted state it is sufficient to again position the trolley vertically, so that the weight of the assembly provides retraction of the handle element 14 and rods 18.

In the embodiment shown in FIG. 10, the simultaneous opposing movement of the handle element 14 and rods 18 is achieved no by belts, but by pinions 28 mounted idly at the centre of each section bar element 4 and simultaneously engaging corresponding toothed portions 30 provided on each arm 12 and on each rod 18.

As can be seen; stability of the support configuration according to the invention under any extent of elongation is provided by the friction existing between the elements 12,18 and the respective guide channels 6,8 due to the weight of the assembly. However this stability is increased by providing on the outer wall of the channels 6 a toothing 32 engagable by the point-shaped lower end of the arms 12, as shown in FIGS. 11 and 12.

Independently of the embodiments used, the multi-purpose support structure according to the present invention is especially advantageous, and in particular:

it can be applied to a large number of objects, such as bags, sacks, rucksacks, suitcases, child carriers and parcels in general, it can be applied to the exterior of these objects by using straps, laces etc. or to their interior, in an interspace provided within them, it can be adjusted according to the user's height, it advantageously uses the weight of the assembly both to facilitate the operations involved in transforming the support, and to ensure its stability in any elongated configuration, it occupies little space when not in use, it enables to avoid any contact with the wheels, when the structure is in retracted condition, due to the presence of the shell shaped body 34, it avoids any touch of the belts with the ground due to the possibility of raising the rucksack, it allows to rest the rucksack on the back of the user due to the lacking of transverse element in the structure.

In the embodiments shown the section bars have been represented rectilinear as well as the arms and the rods, but they could be slightly curved with the concavity facing upward in extracted condition of the structure and this with a better stability.

What is claimed is:

1. A multi-purpose support structure comprising:

a support frame having a pair of longitudinal uprights, each upright comprising first and second guide channels extending parallel to each other, an extendable handle element having two parallel sides slidable within said first guide channel of said uprights and having a transverse connecting element forming a gripping element, a pair of rods, each having a wheel at one end and slidable within said second guide channels, each of said longitudinal uprights housing a substantially extendable, endless flexible element fixed to a corresponding side of said handle element and to one of said rods, for simultaneously moving said parallel sides of said handle element and said rods in opposite parallel directions with respect to said support frame, said endless flexible element passing through a pair of rollers housed inside said flexible endless element.

2. The support structure as claimed in claim 1, wherein each of said longitudinal uprights has a cover element for said guide channels.

3. The support structure as claimed in claim 1, wherein said lower end of each of said uprights is provided with a shell body housing said wheels when retracted.

4. The support structure as claimed in claim 1, wherein said support frame is U-shaped.

* * * * *